(12) United States Patent
Sloan

(10) Patent No.: US 7,198,174 B2
(45) Date of Patent: Apr. 3, 2007

(54) DISPENSER AND FAN-FOLD PACKAGE TECHNIQUE FOR RADIO FREQUENCY IDENTIFICATION TAGS

(75) Inventor: Michael Sloan, Ellicott City, MD (US)

(73) Assignee: Symbol Technologies, Inc., Holtsville, NY (US)

( * ) Notice: Subject to any disclaimer, the term of this patent is extended or adjusted under 35 U.S.C. 154(b) by 70 days.

(21) Appl. No.: 10/998,993

(22) Filed: Nov. 30, 2004

(65) Prior Publication Data

US 2005/0173449 A1    Aug. 11, 2005

Related U.S. Application Data

(60) Provisional application No. 60/541,747, filed on Feb. 5, 2004.

(51) Int. Cl.
*B65H 1/00* (2006.01)
(52) U.S. Cl. ....................................................... 221/33
(58) Field of Classification Search ...................... None
See application file for complete search history.

(56) References Cited

U.S. PATENT DOCUMENTS 4,653,666 A * 3/1987 Mertens ..................... 221/45
4,781,306 A * 11/1988 Smith ......................... 221/33
5,161,712 A   11/1992 Olson
5,755,355 A * 5/1998 Timmerman et al. ......... 221/33
6,153,278 A * 11/2000 Timmerman et al. ...... 428/40.1

* cited by examiner

*Primary Examiner*—Gene O. Crawford
*Assistant Examiner*—Timothy Waggoner
(74) *Attorney, Agent, or Firm*—Sterne, Kessler, Goldstein & Fox P.L.L.C.

(57) ABSTRACT

Methods, systems, and apparatuses are described for the dispensing of radio frequency identification (RFID) tags. In a first aspect of the present invention, a stack of tags is described. In one aspect, the tags are arranged in the stack so that alternate parallel ends of the tags in the stack are removably attached to next tags in the stack by an adhesive material. In an alternative aspect, the tags are arranged in the stack so that the same ends of the tags are removably attached to next tags in the stack by the adhesive material. In a further aspect of the present invention, a dispenser for dispensing tags is described. The dispenser includes a container defining a volume. The container has an outer surface having a slot shaped opening therethrough that opens into the volume. A stack of tags are present in the container. The tags are removably attached to adjacent tags in the stack in an alternating fan-folded configuration. An end of a first tag in the stack extends through the slot shaped opening out of the container. The first tag can be removed from the container by pulling the end to detach the first tag from the stack and cause an end of a next tag in the stack to extend through the slot shaped opening out of the container.

23 Claims, 7 Drawing Sheets

DISPENSER AND FAN-FOLD PACKAGE TECHNIQUE FOR RADIO FREQUENCY IDENTIFICATION TAGS

CROSS REFERENCE TO RELATED APPLICATIONS

This application claims the benefit of U.S. Provisional Application No. 60/541,747, filed Feb. 5, 2004, which is incorporated herein by reference in its entirety.

BACKGROUND OF THE INVENTION

1. Field of the Invention

The present invention relates to radio frequency identification tags, and more specifically to dispensing techniques for radio frequency identification tags.

2. Background Art

Currently, radio frequency identification (RFID) tags are difficult to distribute, control, and dispense.

Thus, what is needed is a method, system, and apparatus for improved dispensing of RFID tags that provides for ease of distribution, control, and packaging of RFID tags.

BRIEF SUMMARY OF THE INVENTION

Methods, systems, and apparatuses are described for the dispensing of radio frequency identification (RFID) tags.

In a first aspect of the present invention, a stack of tags is described. Each tag has opposing first and second surfaces. At an end of each tag, a portion of the second surface is coated with an adhesive material. The portion of the second surface of each tag is removably attached to the first surface of a next tag in the stack by an adhesive material. A first tag can be removed from the stack by pulling a free end of the first tag to detach the first tag from a next tag in the stack. Subsequent tags of the stack can be removed from the stack in a similar manner to the first tag.

In one aspect, the tags are arranged in the stack so that alternate parallel ends of the tags in the stack are removably attached to next tags in the stack by the adhesive material. This arrangement of tags in a stack is also referred to as a fan-folded configuration.

In an alternative aspect, the tags are arranged in the stack so that the same ends of the tags are removably attached to next tags in the stack by the adhesive material. This arrangement of tags in a stack is also referred to as a same-end fan configuration.

In another aspect of the present invention, a dispenser for dispensing tags is described. The dispenser includes a container defining a volume. The container has an outer surface having a slot shaped opening therethrough that opens into the volume. A stack of tags are present in the container. The tags are removably attached to adjacent tags in the stack in an alternating fan-folded configuration. An end of a first tag in the stack extends through the slot shaped opening out of the container.

The first tag can be removed from the container by pulling the end to detach the first tag from the stack and cause an end of a next tag in the stack to extend through the slot shaped opening out of the container.

These and other objects, advantages and features will become readily apparent in view of the following detailed description of the invention.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 8:
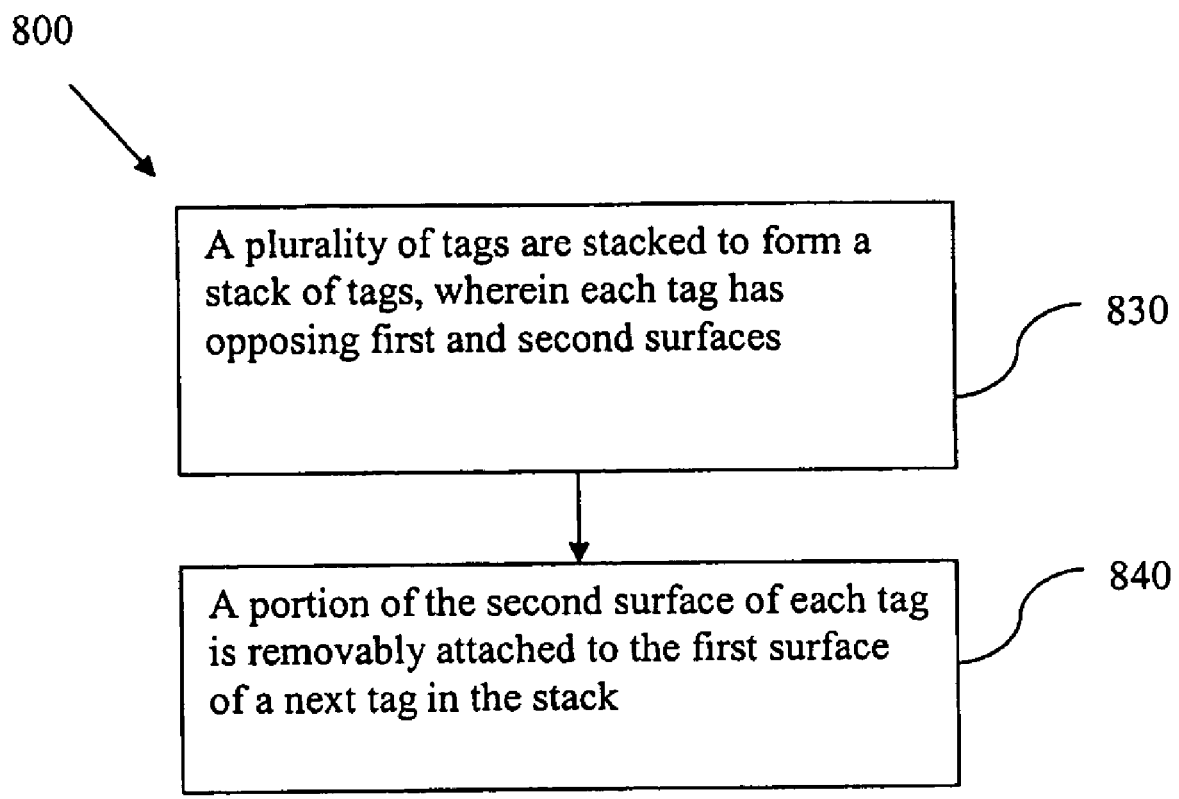

FIG. 8 provides exemplary steps for assembling a tag dispenser according to an embodiment of the present invention.

Figure 9:
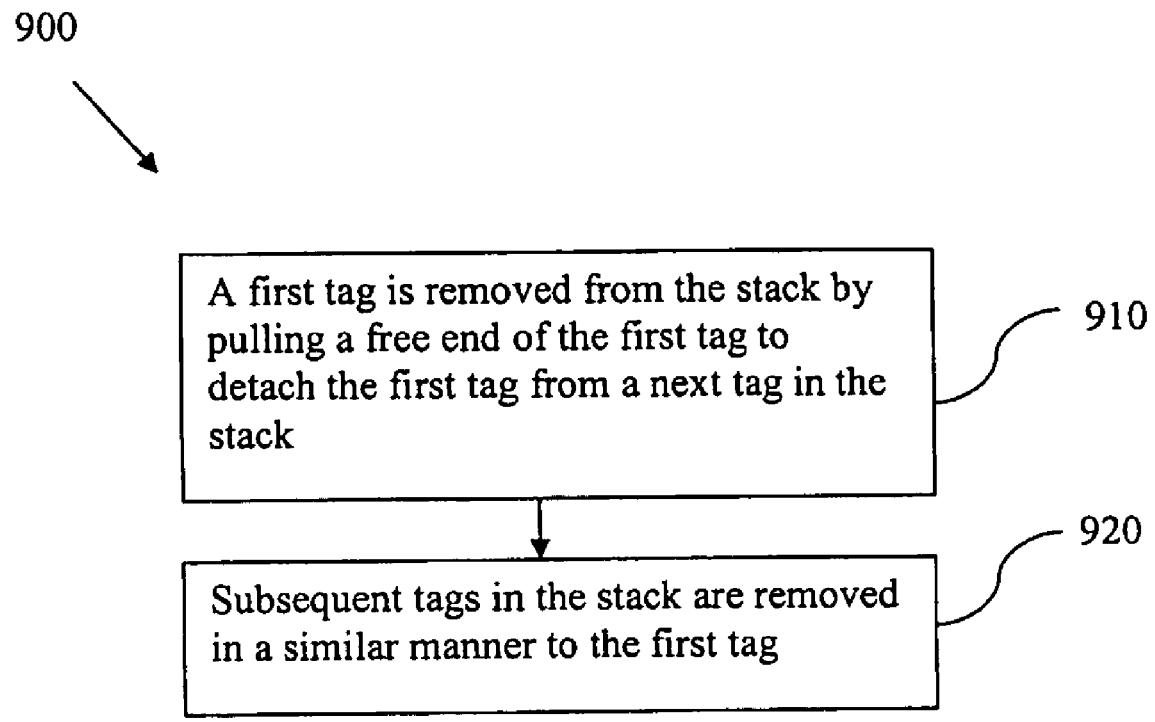

FIG. 9 provides exemplary steps for using a tag dispenser according to an embodiment of the present invention.

Figure 10:
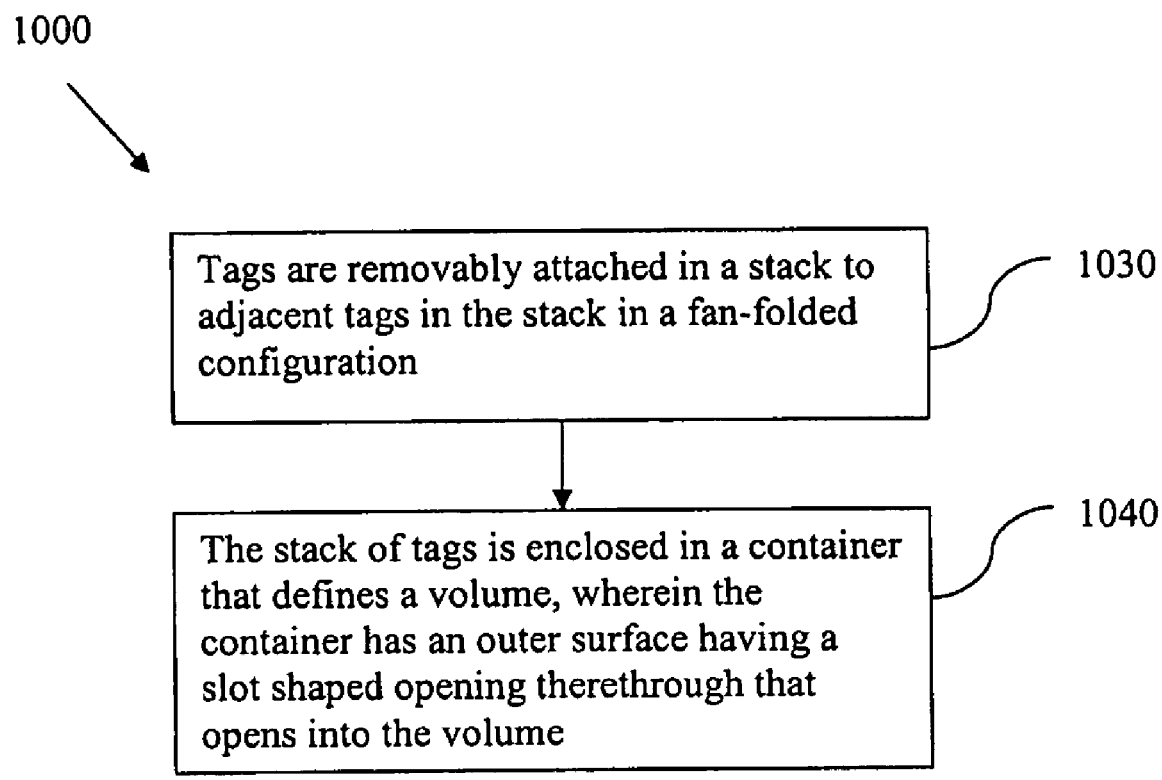

FIG. 10 provides exemplary steps for assembling a tag dispenser according to an embodiment of the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

The present invention relates to the stacking and packaging of radio frequency identification (RFID) tags for dispensing. The present invention simplifies the dispensing of tags, and aids in managing difficulties associated with manual application of RFID tags in an office, an industrial setting, or any other environment.

Previously, others have tried to solve tag distribution problems by cutting the tags off of roll stock and packaging them in bags for small quantities. However, this does not provide for convenient and organized distribution of tags. In an embodiment, a desktop dispenser for fan-configured adhesive-backed RFID tags is created. The dispenser reduces an amount of space required for installation and use of tags in a customer's environment. The dispenser is beneficial in reducing an uncontrolled distribution of tags, and is useful in applications requiring distribution of smaller lots of tags.

Figure 1:
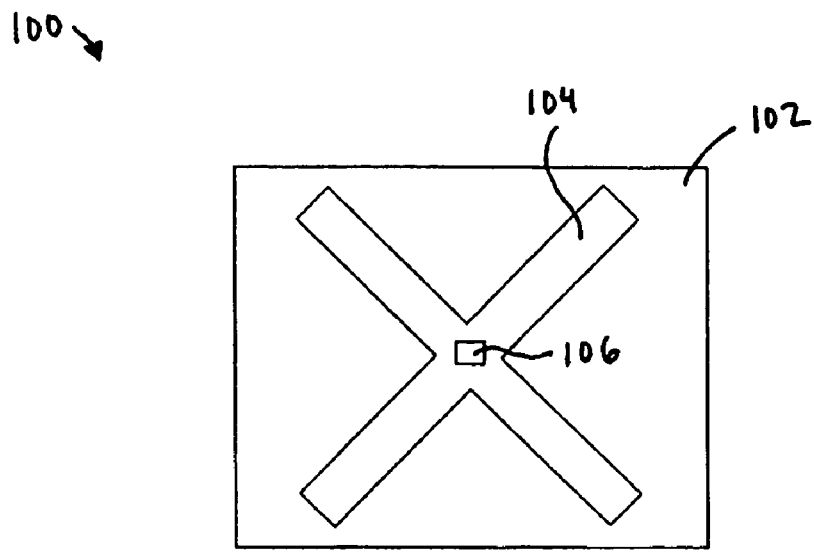
FIG. 1 shows a plan view of an example radio frequency identification (RFID) tag.

The present invention is applicable to any type of RFID tag inlay. FIG. 1 shows a plan view of an example radio frequency identification (RFID) tag 100. Tag 100 includes a substrate 102, an antenna 104, and an integrated circuit (IC) 106. Antenna 104 is formed on a surface of substrate 102. Substrate 102 may be any tag substrate material, including paper, a polymer, a plastic, polyester, or other material.

Antenna 104 can be any tag antenna material, including a metal, a metallic ink, such as a silver ink, or other material. IC 106 includes one or more integrated circuit chips and/or other electronic circuitry. IC 106 is attached to substrate 102, and is coupled to antenna 104. IC 106 may be attached to substrate 102 in a recessed and/or non-recessed location. IC 106 controls operation of tag 100, and transmits signals to, and receives signals from, RFID readers using antenna 104. The present invention is applicable to tag 100, and to any other type of tags, including labels and inlays.

According to embodiments of the present invention, tags such as tag 100 are removably attached to each other in a stack. Each tag may be individually (or in groups) removed from the stack to be subsequently attached to, or otherwise affiliated with, an object or surface.

Figure 2:
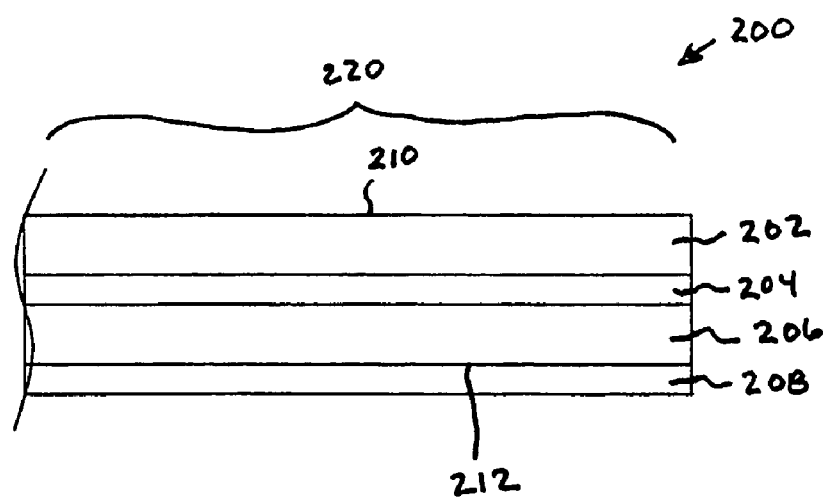
FIG. 2 shows a cross-sectional view of a portion of an RFID tag, according to an embodiment of the present invention

FIG. 2 shows a cross-sectional view of an end 220 of an example RFID tag 200 that is suitable for stacking in this manner, according to an embodiment of the present invention. As shown in FIG. 2, tag 200 includes a release liner layer 202, a first adhesive layer 204, a tag substrate layer 206, and a second adhesive layer 208.

Release liner layer 202 is a layer that has an adhesive resistant surface 210. For example, surface 210 may be coated with silicone or other material to be resistant to an adhesive, as further described below. Release liner layer 202 may include a paper, polymer, plastic, or other material.

Tag substrate layer 206 is a layer that includes a tag, such as tag 100 described above. First adhesive layer 204 attaches release liner layer 202 to tag substrate layer 206. In an embodiment, first adhesive layer 204 attaches or bonds release liner layer 202 to tag substrate layer 206 permanently. Thus, in such an embodiment, release liner layer 202 is not discarded when tag 200 is removed from a stack. Alternatively, in an embodiment a first adhesive layer 204 is not permanent, so that release liner layer 202 can be removed. Thus, by removing release liner layer 202, tag substrate layer 206 can then be attached to an object or item by first adhesive layer 204. For example, first adhesive layer 204 can be a pressure sensitive adhesive material. The surface of tag substrate layer 206 having an antenna and integrated circuit thereon may face towards or away from release liner layer 202.

Second adhesive layer 208 covers a portion of a surface 212 of tag substrate layer 206 at end 220. Second adhesive layer 208 can cover any portion of surface 212, including 50%, more than 50%, or less than 50%. Second adhesive layer 208 is an adhesive material that is used to releasably attach tags 200 together in a stack. For example, second adhesive layer 208 can be an adhesive material same or similar to that used to hold individual sheets of POST-IT NOTES together.

Figure 3:
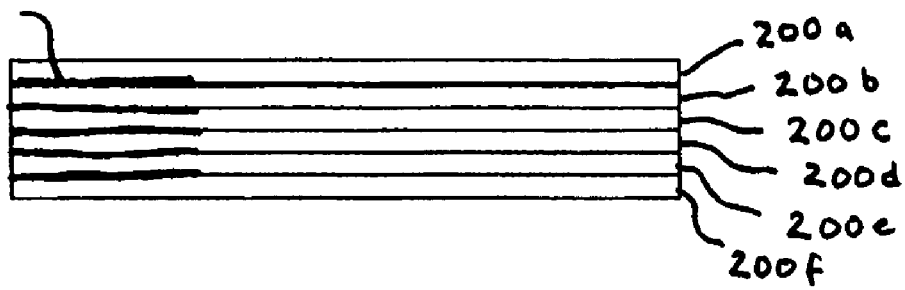
FIG. 3 shows a side view of a stack of RFID tags for dispensing, according to an example embodiment of the present invention.

FIG. 3 shows a side view of a plurality of tags 200a–f arranged in an example stack 300 to be used as a tag dispenser. Tags 200 in stack 300 are releasably attached to adjacent tags 200 by second adhesive layer 208. In other words, while tags 200 are attached together in stack 300, tags 200 may be removed from stack 300 by pulling/peeling the tags 200 from the stack. For example, as shown in FIG. 3, second adhesive layer 208a of first tag 200a adheres to release liner layer 202 of a second tag 200b in stack 300. Because surface 210 of release liner layer 202 is adhesive resistant, first tag 200a can be detached/peeled from second tag 200b with relative ease, and without damaging either of tags 200a and 200b.

Figure 4:
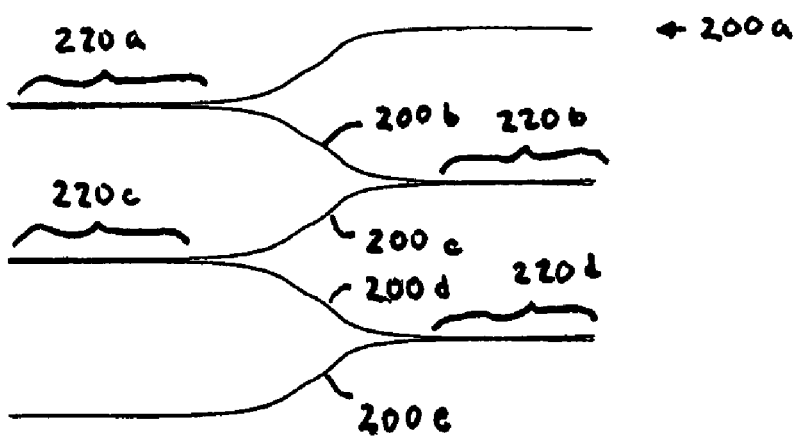
FIGS. 4 and 5 show side views of example fan dispensing designs for stacks of RFID tags, according to embodiments of the present invention.
Figure 5:
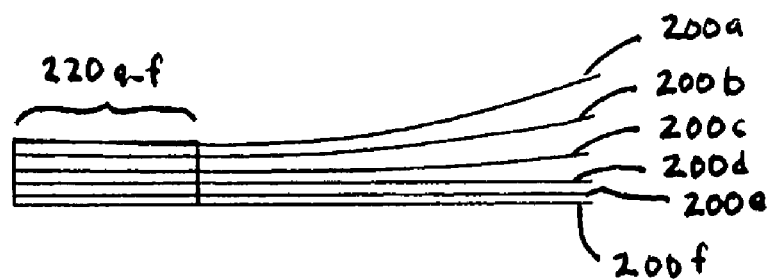

FIGS. 4 and 5 show side views of example tags stacked in different fan-type dispensing configurations, according to embodiments of the present invention. For example, FIG. 4 shows a stack 400 having tags 200a–e stacked in a fan-folded configuration (stack 400 is shown expanded in FIG. 4 for illustrative purposes), according to an example embodiment of the present invention. As shown in FIG. 4, tags 200a–e are arranged in stack 400 so that alternate parallel ends 220a–d of tags 200a–d in stack 400 are removably attached to respective next tags 200b–e in stack 400 by second adhesive layer 208. In other words, tags 200a–e are attached to each other in stack 400 at alternating sides of stack 400. Thus, tags 200a–e are attached to each other "accordion-style", also called a fan-folded configuration.

FIG. 5 shows a stack 500 having tags 200a–f stacked in a same-end fan configuration, according to an example embodiment of the present invention. As shown in FIG. 5, tags 200a–e are arranged in stack 500 so that all ends 220a–e of tags 200 are removably attached to respective next tags 200b–f by second adhesive layer 208 at the same side of stack 500.

In embodiments, stacks of tags, such as stacks 300, 400, and 500, can be directly used to dispense tags by a user. Alternatively, stacks of tags can be placed in a dispenser to enhance dispensing of tags by a user.

Figure 6:
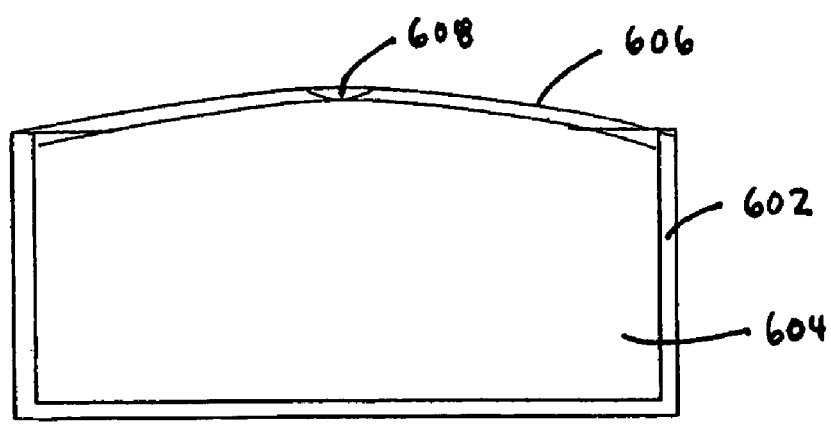
FIG. 6 shows an example RFID tag dispenser, according to an embodiment of the present invention.

For example, FIG. 6 shows a cross-sectional view of an RFID tag dispenser 600, according to an example embodiment of the present invention. Tag dispenser 600 includes a container 602 that defines a volume 604. Container 602 has an outer surface 606 having a slot shaped opening 608. Opening 608 opens into volume 604.

Figure 7:
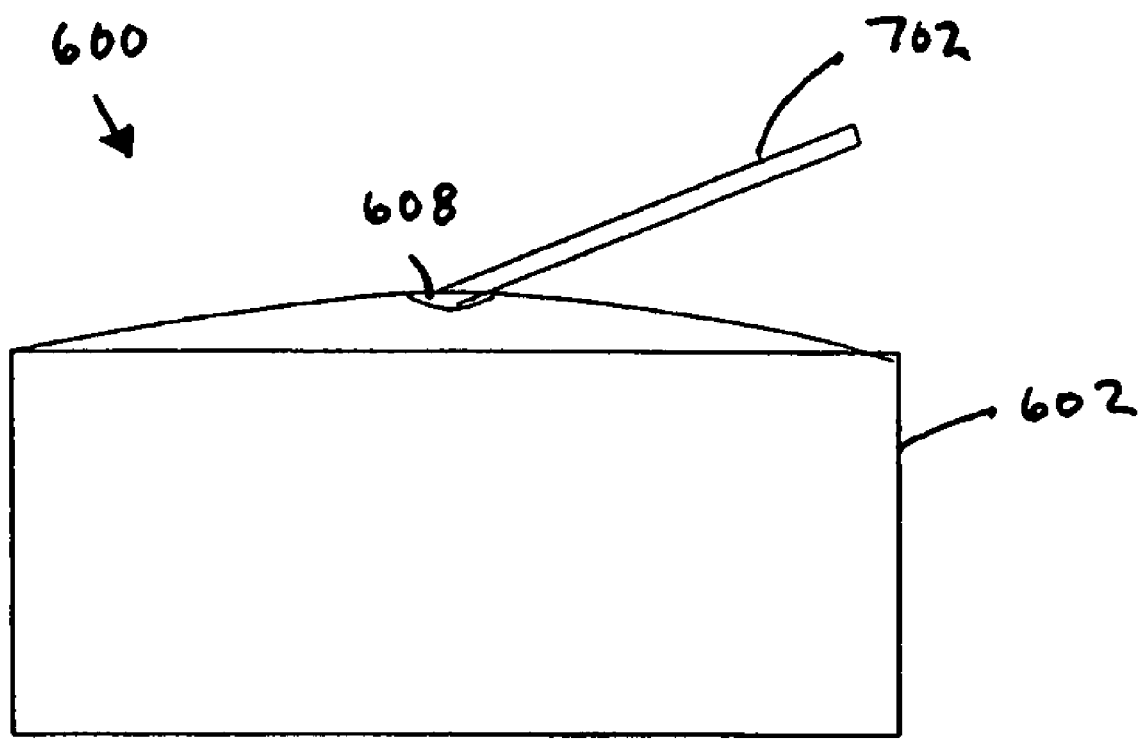
FIG. 7 shows the RFID tag dispenser of FIG. 6, with a stack of tags inside, according to an example embodiment of the present invention.

A stack of tags can be placed in volume 604 of container 602. For example, FIG. 7 shows a side view of dispenser 600, with a stack of tags located therein. For example, the stack can be arranged in a fan-type configuration, such as a fan-folded configuration similar to stack 400 shown in FIG. 4. As shown in FIG. 7, an end 702 of a first tag in the stack inside dispenser 600 extends through slot shaped opening 608 out of container 602. The first tag can be removed from container 602 by a user pulling end 702. Pulling end 702 detaches the first tag from the stack in container 602, and causes an end of a next tag in the stack to extend through slot shaped opening 608 out of container 602. When the stack is formed in an alternating fan-folded configuration, the end of the next tag in the stack will extend out of opening 608 in a direction opposite of the direction shown for end 702 in FIG. 7 (e.g., end 702 is shown extending toward the right in FIG. 7, so the end of the next tag will extend toward the left).

For example, container 602 can be made of plastic, metal, or other material.

U.S. Pat. No. 5,161,712 to Olson (the '712 patent) describes a pop-up noted dispenser for delivery of self-stick removable notes, and is incorporated by reference herein in its entirety. In an example embodiment, containers as described in the '712 patent may be adapted according to the novel teachings described herein to be used to dispense RFID tags.

Thus, embodiments of the invention include RFID tags in a stack (e.g., tags stacked in a fan-type configuration), RFID tag packaging, and a RFID tag dispenser.

FIG. 8 shows a flowchart 800 providing exemplary steps for assembling an embodiment of the present invention. Flowchart 800 begins at step 830. In step 830, a plurality of tags are stacked to form a stack of tags, wherein each tag has opposing first and second surfaces. For example, the stack of tags can be arranged in the fan-type dispensing configurations shown in FIG. 4 (same-end fan configuration) and FIG. 5 (alternating fan-folded configuration), or can be stacked in other configurations.

In step 840, a portion of the second surface of each tag is removably attached to the first surface of a next tag in the stack. For example, referring to FIG. 2, the second surface is the surface of second adhesive layer 208 and the first surface is adhesive resistant surface 210 of release liner layer 202. Because the first surface is adhesive resistant surface 210, the tags are easily detached from each other (i.e., removably attached), as mentioned above.

FIG. 9 shows a flowchart 900 providing exemplary steps for using an embodiment of the present invention. Flowchart 900 begins at step 910. In step 910, a first tag is removed from the stack by pulling a free end of the first tag to detach the first tag from a next tag in the stack. As described above, the stack of tags can be configured in the same-end fan configuration (FIG. 4), the alternating fan-folded configuration (FIG. 5), or other configuration. Thus, in the example of FIG. 4, the first tag, tag 200*a* can be removed from stack 400 by pulling a free end (e.g., the right end of tag 200*a* shown in FIG. 4) of tag 200*a* to detach tag 200*a* from stack 400. In the example of FIG. 5, the first tag, tag 200*a* can be removed from stack 500 by pulling a free end (e.g., the right end of tag 200*a* shown in FIG. 5) of tag 200*a* to detach tag 200*a* from stack 500.

In step 920, subsequent tags in the stack are removed in a similar manner to the first tag. For example, as shown in FIG. 4, tag 200*b* is the next tag in stack 400. Tag 200*b* can be removed from stack 400 similarly to tag 200*a*, by pulling a free end of tag 200*b* (e.g., the left end of tag 200*b* in FIG. 4, after tag 200*a* is removed). The free end of tag 200*b* is pulled to detach tag 200*b* from stack 400. Then tag 200*c* can be removed from stack 400, followed by tag, 200*d*, etc.

In the example of FIG. 5, tag 200*b* is the next tag in stack 500. Tag 200*b* can be removed from stack 500 similarly to tag 200*a*, by pulling a free end of tag 200*b* (e.g., the right end of tag 200*b* in FIG. 5, after tag 200*a* is removed). The free end of tag 200*b* is pulled to detach tag 200*b* from stack 500. Then tag 200*c* can be removed from stack 500, followed by tag, 200*d*, etc.

FIG. 10 shows a flowchart 1000 providing exemplary steps for assembling an embodiment of the present invention. Flowchart 1000 begins at step 1030. In step 1030, tags are removably attached in a stack to adjacent tags in the stack in a fan-type dispensing configuration. Again, the fan-type dispensing configuration can be the same-end fan configuration (FIG. 4), the alternating fan-folded configuration (FIG. 5), or some other similar fan-type dispensing configuration. In addition, in like manner to the method described with reference to flowchart 800, the tags can be removably attached via adhesive resistant surface 210 and second adhesive layer 208.

In step 1040, the stack of tags is enclosed in a container that defines a volume, wherein the container has an outer surface having a slot shaped opening therethrough that opens into the volume. The container can be RFID tag dispenser 600, for example. Step 1040 may include enclosing the stack in the container such that an end of a first tag in the stack extends through the slot shaped opening out of the container. In this manner, a user can access the end of the first tag, to remove the first tag from the container, as described above. The stack of tags can be manually enclosed in the container, or by automated system. For example, the container can have a lid portion that can be removed or opened, providing access to the inside of the container (e.g., access to volume 604 shown in FIG. 6). The stack of tags can then be inserted into the container, and the lid closed.

Embodiments of the present invention allow for improvements in at least the following areas:

Distribution: The RFID tag set/stack can be packaged in shrink-wrapped units that allow handling of fixed lots of tags. Each set of tags will be assigned serial and lot numbers to allow a master database to track distribution of the security controlled tags.

Control: These fixed lots allow for tracking of individual tags by marking individual packages of numerous tags.

Dispensing: For applications where manual handling of RFID tags is required, the invention allows for a waste-free application and processing of the product. In an embodiment, the individual tags are applied without removing a release liner normally found on any adhesive backed RFID tag system.

In embodiments, any size of tags may be used in this package format.

The present invention allows for the supply of large quantities of tags in an industry acceptable format. The stacks of RFID tags (with or with out tag dispenser) are easily distributed in areas that require the tags but have little space to accommodate a conventional tag dispenser.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. An apparatus for dispensing radio frequency identification (RFID) tags, comprising:
    a stack of RFID tags, each RFID tag of said stack having opposing first and second surfaces, wherein at an end of said each RFID tag, a portion of said second surface is coated with an adhesive material;
    wherein said portion of said second surface of each RFID tag is removably attached to said first surface of a next RFID tag in said stack by said adhesive material;
    wherein a first RFID tag can be removed from said stack by pulling a free end of said first RFID tag to detach said first RFID tag from a next RFID tag in said stack; and
    wherein subsequent RFID tags of said stack can be removed from said stack in a similar manner to said first RFID tag.

2. The apparatus of claim 1, wherein said RFID tags are arranged in said stack so that alternate parallel ends of said RFID tags in said stack are removably attached to next RFID tags in said stack by said adhesive material.

3. The apparatus of claim 1, wherein said RFID tags are arranged in said stack so that the same ends of said RFID tags are removably attached to next RFID tags in said stack by said adhesive material.

4. The apparatus of claim 1, wherein said first surface of said each RFID tag has an adhesive layer that attaches a release liner layer thereon; and
    wherein said release liner layer has an adhesive resistant surface that faces away from said adhesive layer, thereby allowing said each RFID tag to be removably attached to next RFID tags in said stack.

5. The apparatus of claim 1, wherein said RFID tags comprise paper.

6. The apparatus of claim 1, wherein said RFID tags comprise a polymer.

7. The apparatus of claim 1, wherein said RFID tags comprise a plastic.

8. The apparatus of claim 1, wherein said RFID tags comprise a polyester.

9. An apparatus for dispensing radio frequency identification (RFID) tags, comprising:
 a container defining a volume, wherein said container has an outer surface having a slot shaped opening therethrough that opens into said volume; and
 a stack of RFID tags in said container, wherein said RFID tags are removably attached to adjacent RFID tags in said stack in an alternating fan-folded configuration, and wherein an end of a first RFID tag in said stack extends through said slot shaped opening out of said container.

10. The apparatus of claim 9, wherein said first RFID tag can be removed from said container by pulling said end to detach said first RFID tag from said stack and cause an end of a next RFID tag in said stack to extend through said slot shaped opening out of said container.

11. The apparatus of claim 9, wherein a first surface of each RFID tag in said stack has an adhesive layer that attaches a release liner layer thereon; and
 wherein said release liner layer has an adhesive resistant surface that faces away from said adhesive layer, thereby allowing said RFID tags to be removably attached to said adjacent RFID tags in said stack.

12. The apparatus of claim 9, wherein said RFID tags comprise paper.

13. The apparatus of claim 9, wherein said RFID tags comprise a polymer.

14. The apparatus of claim 9, wherein said RFID tags comprise a plastic.

15. The apparatus of claim 9, wherein said RFID tags comprise a polyester.

16. A method of dispensing radio frequency identification (RFID) tags, wherein each RFID tag of said RFID tags has opposing first and second surfaces, comprising:
 stacking said RFID tags into a stack; and
 removably attaching a portion of said second surface of each RFID tag to said first surface of a next RFID tag in said stack.

17. The method of claim 16, further comprising:
 removing a first RFID tag from said stack by pulling a free end of said first RFID tag to detach said first RFID tag from a next RFID tag in said stack; and
 removing subsequent RFID tags of said stack in a similar manner to said first RFID tag.

18. The method of claim 16, further comprising:
 arranging said RFID tags in said stack so that alternate parallel ends of said RFID tags in said stack are removably attached to next RFID tags in said stack.

19. The method of claim 16, further comprising:
 arranging said RFID tags in said stack so that the same ends of said RFID tags are removably attached to next RFID tags in said stack.

20. The method of claims 16, wherein removably attaching said each RFID tag to next RFID tags in said stack comprises:
 coating said first surface of said each RFID tag with an adhesive layer that attaches a release liner layer thereon; and
 providing said release liner layer with an adhesive resistant surface that faces away from said adhesive layer, thereby allowing said each RFID tag to be removably attached to said next RFID tags in said stack.

21. A method of packaging radio frequency identification (RFID) tags for dispensing, comprising:
 (a) removably attaching RFID tags in a stack to adjacent RFID tags in said stack in an alternating fan-folded configuration;
 (b) enclosing the stack of RFID tags in a container that defines a volume, wherein the container has a outer surface having a slot shaped opening therethrough that opens into the volume, wherein (b) comprises:
  (1) enclosing the stack in the container such that an end of a first RFID tag in the stack extends through the slot shaped opening out of the container.

22. The method of claim 21, further comprising:
 (c) pulling the end to remove the first RFID tag from the container and cause an end of a next RFID tag in the stack to extend through the slot shaped opening out of the container.

23. The method of claim 21, wherein removably attaching RFID tags comprises:
 coating a first surface of each RFID tag in said stack with an adhesive layer that attaches a release liner layer thereon; and
 providing said release liner layer with an adhesive resistant surface that faces away from said adhesive layer, thereby allowing each RFID tag in said stack to be removably attached to said adjacent RFID tags in said stack.

* * * * *